United States Patent

Crowell et al.

[11] Patent Number: 5,804,832
[45] Date of Patent: Sep. 8, 1998

[54] DIGITAL ARRAY FOR RADIOGRAPHIC IMAGING

[75] Inventors: John A. Crowell, Wilmington, Del.; Joseph A. Perrotto, Landenberg, Pa.; Lothar S. Jeromin, Newark, Del.; Denny L. Y. Lee, West Chester, Pa.

[73] Assignee: Sterling Diagnostic Imaging, Inc., Newark, Del.

[21] Appl. No.: 756,041

[22] Filed: Nov. 26, 1996

[51] Int. Cl.$^6$ .................................................. G01T 1/24
[52] U.S. Cl. ............................... 250/580; 250/370.09
[58] Field of Search ........................... 250/580, 370.01, 250/370.08, 370.09; 378/98.8

[56] References Cited

U.S. PATENT DOCUMENTS

| | | | |
|---|---|---|---|
| 4,931,643 | 6/1990 | Amtmann | 250/327.2 |
| 5,127,038 | 6/1992 | Jeromin et al. | 378/28 |
| 5,195,113 | 3/1993 | Kuwabara | 378/34 |
| 5,220,170 | 6/1993 | Cox et al. | 250/370.09 |
| 5,319,206 | 6/1994 | Lee et al. | 250/370.09 |
| 5,381,014 | 1/1995 | Jeromin et al. | 250/370.09 |
| 5,528,043 | 6/1996 | Spivey et al. | 250/370.09 |
| 5,635,718 | 6/1997 | DePugdt et al. | 250/370.09 |

*Primary Examiner*—Michael J. Tokar
*Assistant Examiner*—Richard Hanig
*Attorney, Agent, or Firm*—Ratner & Prestia

[57] ABSTRACT

A digital array for capturing a radiogram. The array includes a generally flat base on which there is mounted with a plurality of shock absorbing mounts a rigid support plate. A radiation electronic detection panel is mounted on the rigid plate in a way that the panel "floats" over the base. Electronic circuitry associated with the radiation detection panel is connected thereto with flexible connectors. A cover, which is transparent to X-ray radiation and opaque to visible radiation, is attached to the base to form a light tight enclosure for the panel. The top cover inner surface opposite the front surface of the radiation detection panel, is spaced from the detection panel front surface, and the detection panel is also spaced from the side walls.

17 Claims, 3 Drawing Sheets

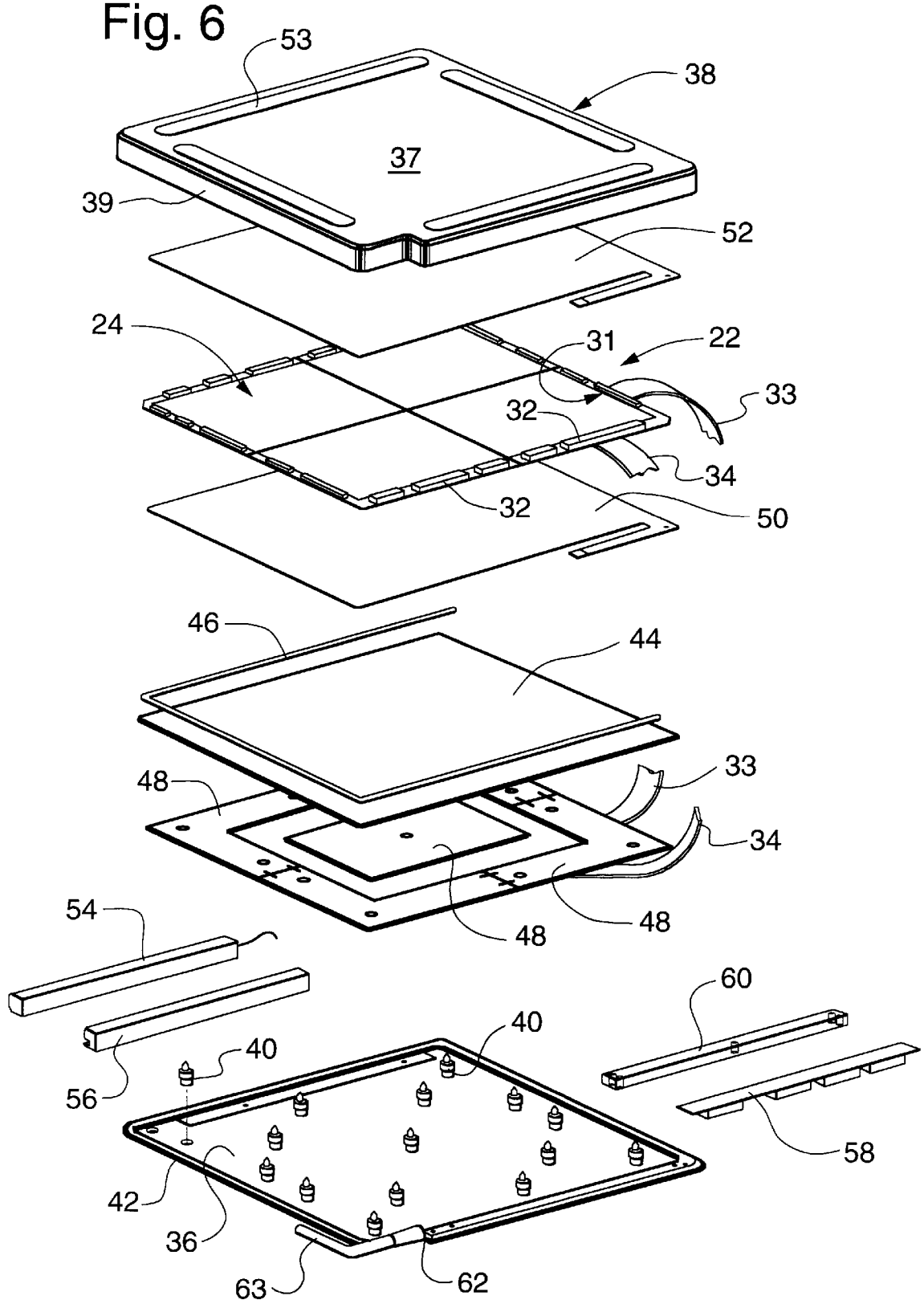

DIGITAL ARRAY FOR RADIOGRAPHIC IMAGING

BACKGROUND OF THE INVENTION

1. Field of the Invention

This invention relates to electronic radiographic imaging systems and more particularly to a substantially self contained device for use with a source of X-ray radiation for capturing a radiogram

2. Description of Related Art

Traditional radiographic imaging systems comprise a source of X-ray radiation, patient supporting equipment adapted to support a patient in an appropriate position during the imaging process, and an image capture device. This image capture device typically comprises a light tight enclosure known as a cassette, in which there is placed a photographic film to record the X-ray generated image. The image may be recorded directly, or as is more usual, the cassette includes a pair of intensifying screens which absorb a large portion of the incident X-ray radiation and convert it to visible radiation in an area of the visible spectrum to which the photographic film is most sensitive. The film records this visible image as a latent photographic image. Following exposure, the film is removed from the cassette and developed to form a stable visible image known as a radiogram, which is used for diagnostic purposes.

In the past few years, there has been a great effort to develop an X-ray detection system which will produce a radiogram adequate for diagnostic purposes without the use of photographic films. Numerous patents have issued on different kinds of radiation detection panels which produce an electronic signal which after electronic processing may be displayed on a monitor for study and diagnosis. One such panel is described in U.S. Pat. No. 5,319,206.

A number of problems arise when such panels are used in a real life environment, such as a hospital for actual medical diagnosis. To be truly useful, a detection panel must be large, and large size panels are difficult to manufacture. The prior art has addressed this panel size problem by a process called tiling, which involves creating a large panel out of an assembly of smaller panels, carefully abutted to maintain the continuity of the detector elements in the panel and glued together to form a single composite panel of appropriate size. U.S. Pat No. 5,381,014 discloses a process for making such a composite large panel.

Whether large panels are created by the tiling process discussed above, or by careful manufacturing of a single large panel, such large panels are prone to internal damage of the radiation sensitive arrays and delamination of the various functional layers due to panel stresses which occur because of rough handling, twisting, the weight of the patient positioned over the panel for examination, dropping etc.

There is therefore a need for appropriate packaging of such radiation detection panels into a package which is able to withstand the rough treatment expected in a real life environment. Preferably such packaging will be of a size and weight which makes it relatively easy to carry from one location to another and permit using it with the existing X-ray equipment with minimal adaptation. Thus the package should be strong and especially able to isolate the detector within from outside stresses and torsional and impact forces, yet it should be light and compact to permit ease of handling.

These requirements impose restrictions and present a challenge in designing such a package because of the multiple, often conflicting requirements for such package. It is thus an object of this invention to provide a radiation detector comprising an electronic radiation detection panel which offers the necessary physical protection to the panel within the restrictions discussed above. The radiation detector constructed in accordance with the present invention will be referred to henceforth as a "Digital Array", to distinguish it from the traditional film screen combination cassettes used in traditional radiography.

These and other objects of the present invention will become clear from the following description.

SUMMARY OF THE INVENTION.

The present invention is a digital array for capturing a radiogram comprising a generally flat opaque base having an inner surface and side edges with a plurality of shock absorbing mounts mounted on the base inner surface. A rigid support which can be a plate, is mounted on the shock absorbing mounts, and on the support is mounted a radiation electronic detection panel. Electronic circuitry associated with the radiation detection panel is connected thereto. A cover which is transparent to X-ray radiation and opaque to visible radiation, comprising a top and side walls is attached to the base to form a light tight enclosure for the panel, support plate and electronics. The top cover inner surface opposite the front surface of the radiation detection panel, is spaced from the detection panel front surface, and the detection panel is also spaced from the side walls.

The digital array preferably further includes a first source of visible or infrared radiation generally co-extensive with the front surface of the radiation detection panel located between the front surface of the radiation detection panel and the inner surface of the top cover. The digital array also includes switching circuitry operable on command to activate and de-activate the visible radiation source turning it on and off and to illuminate the detection panel with visible or infrared radiation for a desired period of time.

If desired, two visible or infrared radiation sources may be used one on either side of the panel. Lead strip inserts in selected areas may be used to protect sensitive electronic circuitry from radiation damage.

BRIEF DESCRIPTION OF THE DRAWINGS

The invention can be more fully understood from the following description thereof in connection with the accompanying drawings described as follows.

FIG. 6 is an exploded view of a preferred embodiment of a digital array according to this invention.

DESCRIPTION OF THE PREFERRED EMBODIMENT(S)

Figure 1:
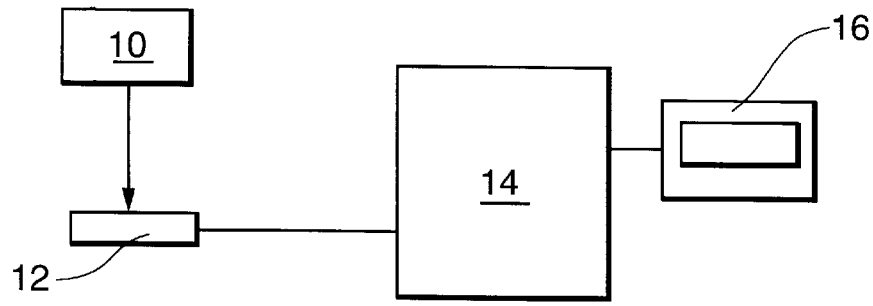
FIG. 1 is a schematic representation of a system using the present digital array FIG. 2 Is a schematic representation showing a typical positioning of a patient in relationship to the digital array of the present invention

Throughout the following detailed description, similar reference characters refer to similar elements in all figures of the drawings.

Referring now to FIG. 1 there is shown in schematic representation a simplified electronic radiographic detection system in which the main components are as follows:

a) A source 10 of exposing radiation such as X-rays.

b) A digital array 12 for detecting the exposing radiation after it has passed through a patient ( or other object) under examination;

c) An electronic control center 14 for controlling the digital array and for receiving, storing and processing information from the digital array; and e) A display system 16 for displaying the information received from the digital array 12 and processed in the control circuit 14.

When the exposing radiation source is a source of X-ray radiation, it can be any conventional Medical or Industrial X-ray source. Such sources are well known in the art and need no further description here. The control electronics 14 comprise typically a Central Processing Unit (CPU) with associated Read Only memory (ROM), Random Access memory (RAM) and, if desired, data storage means such as tape or disk, which may be provided by a properly programmed computer. The particular programming of such computer will depend on the needs and abilities of the complete system; as a minimum the computer should be programmed to accept digital image data from the array, preferably through a serial connector such as an RS232 input, even though parallel data input is also an acceptable alternate data input method. Accepting a string of digital image data storing it in a Random Access or other memory, and reconstructing the data for displaying the image represented by the digital data in either a Cathode Ray tube display or by printing a hard copy, is well known technology which needs no further elaboration.

It is preferred that the computer be also programmed to initiate and provide appropriate commands to operate the system. For instance the computer may be used to initiate the readout sequence to obtain the data from the detection panel within the digital array. The computer may also be used to initiate any necessary sequence of events needed to the operation of the array and X-ray equipment to obtain a radiogram. When the digital array 12 includes a detection panel of the type disclosed in U.S. Pat. No. 5,381,014 issued to Jeromin et al., the computer may be used to control the sequence of the application of the various voltages to the panel, and to sequentially address the switching lines and amplifiers to retrieve the radiogram data from the panel as required by the detection panel structure described in this patent. Other detection panels, operating differently, may require different control sequences, however, programming a computer to perform such functions is well within the scope of the art and outside the scope of this invention.

Figure 2:
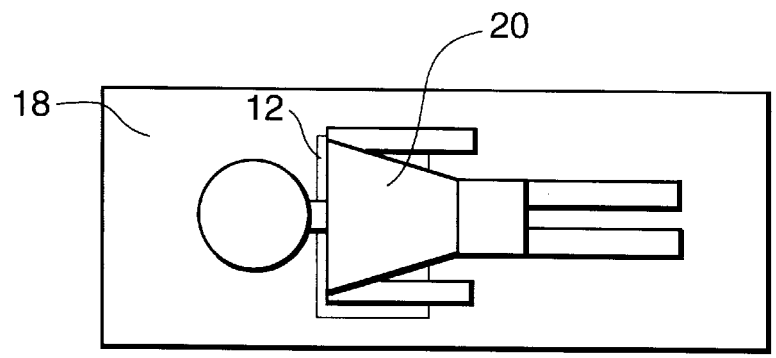

FIG. 2 shows in schematic representation a patient 20 positioned on an examination surface 18. The surface 18 in this instance is a horizontal surface such as a table on which a patient may be placed. Typical hospital radiographic equipment provides such a table for use with an X-ray source. A space is provided underneath the table surface for receiving a traditional cassette, and when desired, a "bucky". A "bucky" is a device which includes an anti-scatter grid which is used to reduce X-ray fuzziness resulting from X-ray scatter. The bucky may include means for vibrating or shaking the grid to eliminate the introduction of shadow images of the grid itself. The digital array of the present invention would be placed in that space for exposure. A "bucky" would be optionally used for the same intent and purpose as for the traditional film/screen cassette combination.

Figure 3:
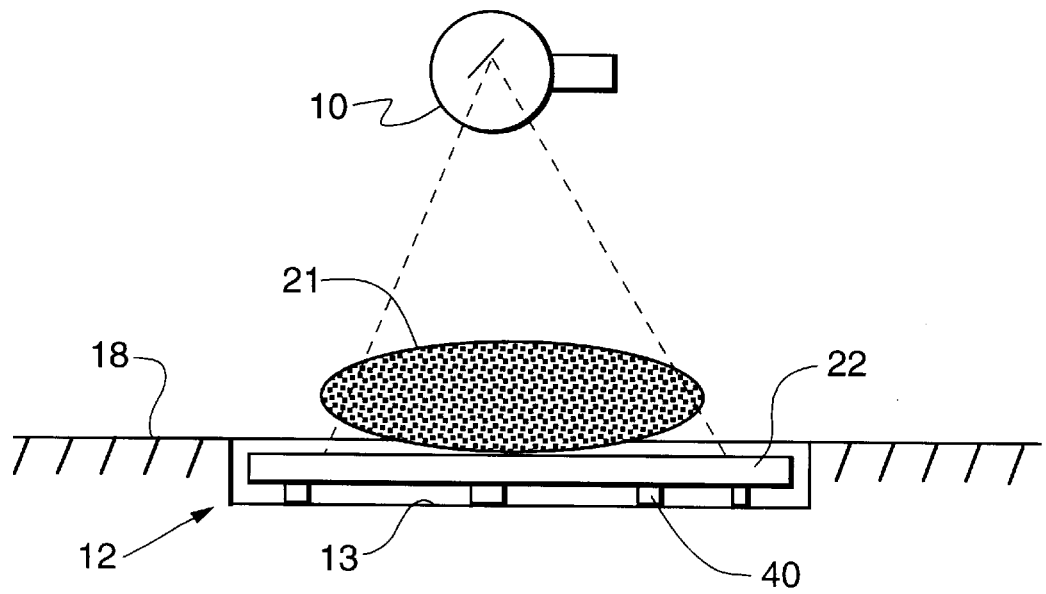
FIG. 3 is a schematic elevation representation showing the panel front cover deflection as a result of excessive patient weight during X-ray examination.

FIG. 3 illustrates a problem occurring when an overweight patient is placed on an examination table for radiation exposure. In the illustrated situation the digital array is used without a "bucky". In order to minimize the radiation exposure level of the patient, the table surface is made of materials which present low x-ray absorption or with materials used at minimum thickness and often both. The equipment, therefore, is not heavily built and under the weight of the patient, the table surface may deflect somewhat particularly over the array, where it is largely unsupported, pressing on the top of the digital array placed in that space for capturing the radiation image.

While such compression of the traditional film screen cassette is acceptable and does not result in damage to either the photographic film or the cassette, the same is not true for the electronic detection panels contemplated in this invention. As mentioned earlier such detection panels are quite sensitive to damage due to pressure or stress. This is so because the panels typically comprise a glass base on which there are deposited a plurality of layers which form the TFT transistor arrays and the photoconductor used to detect the radiation. Damage to individual elements, cracking of the panel and layer delamination due to stress forces are real problems. Applying torsional forces to the panel during handling, or pressure to the panel due to the weight of a patient undergoing examination is a problem to be avoided.

Under the present invention, the digital array 12 includes an enclosure 13 within which there is mounted in floating support arrangement, on shock absorbing mounts 40, a radiation detection panel 22. The top cover of the enclosure is designed to permit some deflection under load without contacting the radiation detection panel 22, as will be explained in detail below.

Figure 4:
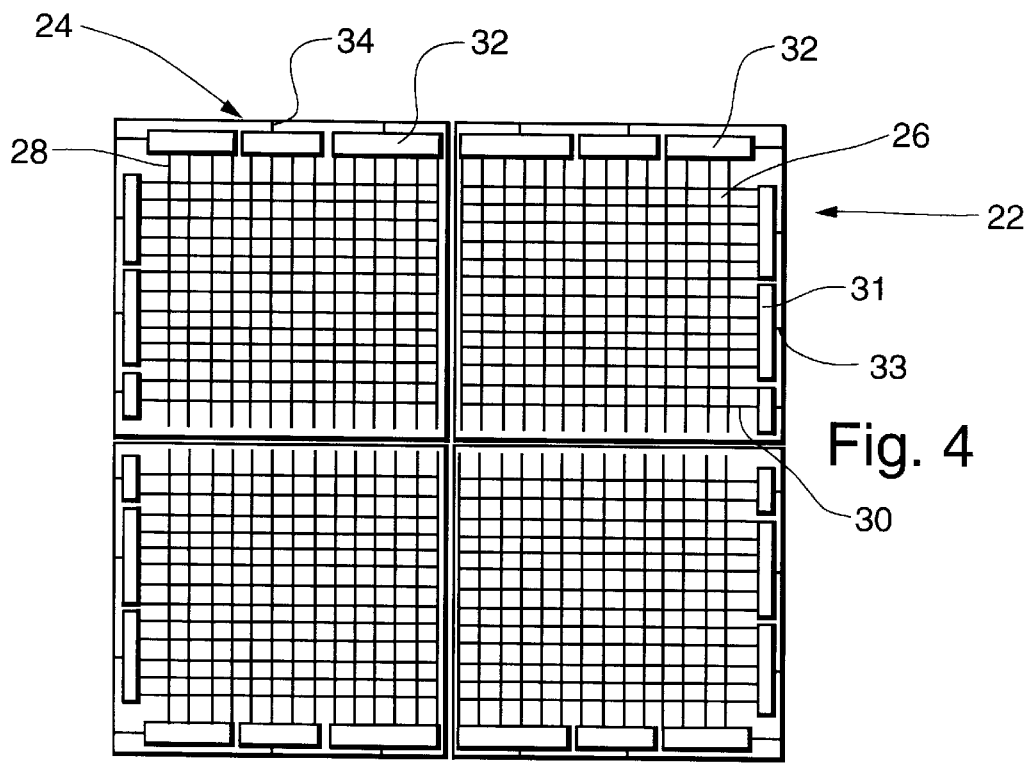
FIG. 4 is a schematic plan view of a radiation detection panel of the type used in the present invention.

FIG. 4 illustrates a large size radiation detection panel for diagnostic purposes which is composed of four individual ¼ panels 24. The number of smaller panels used in constructing the full size detection panel is of no significance to the present invention; eight, two and even a single continuous panel would still need similar physical protection. The number four is for illustration purposes only.

The ¼ panels are of the type disclosed in the aforementioned U.S. Pat. No. 5,381,014 issued to Jeromin et al. and have been joined together as disclosed therein. The panels comprise a glass substrate on which there is built a plurality of individual radiation detection elements 26 arrayed in rows and columns. Each element is connected to at least two access conductive lines, an address line 28 and a read out line 30. The access lines extend between the arrayed elements and are connected to electronic modules 31 and 32 respectively. These modules are preferably arrayed along the panel edges and comprise address circuitry 32 which permits to sequentially address selected detector elements in selected rows and columns and readout amplifiers 31 which amplify the signal from the addressed detector elements. Modules 31 and 32 are accessed through lines 33 and 34 respectively. Lines 33 and 34 lead to additional control and data processing electronics needed to operate the panel. Such additional electronics may be located on one or more printed circuit boards connected to the panel through flexible multiple wire connectors.

Figure 5:
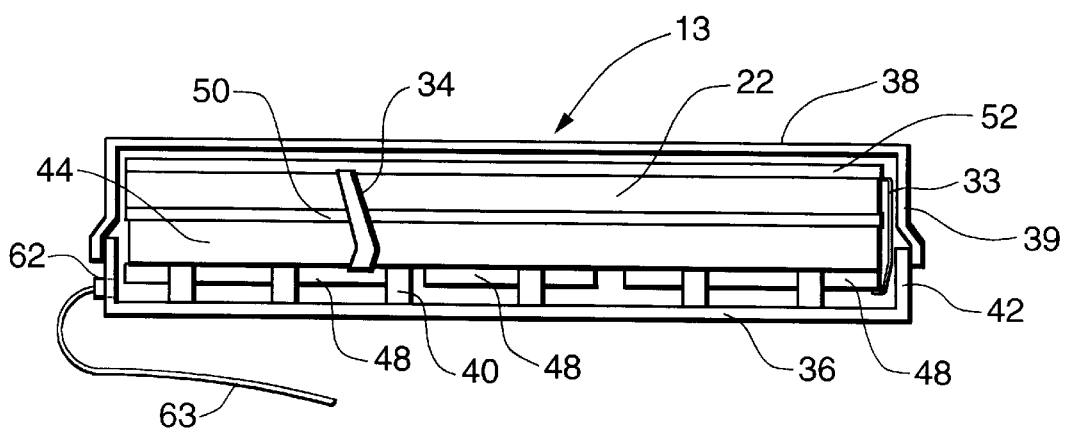
FIG. 5 is a schematic elevation representation of a digital array in accordance with this invention.

FIG. 5 shows in detailed schematic elevation an enclosure 13 containing a radiation detection panel 22, constructed in accordance with the present invention to form a digital array. FIG. 6 is an exploded assembly view of a preferred embodiment of such a digital array.

Referring now to FIGS. 5 and 6, the digital array has a generally rectangular base 36 having a raised lip 42 extending along its perimeter. The base is preferably made of aluminum or other structurally rigid material and is preferably electrically conductive. The material must be opaque to at least visible radiation. The plurality of electronic components within the enclosure generate heat which must be removed from the enclosure. One convenient way to dissipate the heat generated inside the enclosure by the electronic components, is to select a base material with good thermal conductivity characteristics. Of course other heat dissipation methods may be chosen, including the provision of heat dissipating surfaces on the base or the enclosure.

Mounted on the inside surface of the base 36 is a plurality of shock absorbing mounts 40. Mounts 40 may be made of rubber or similar flexible material and support rigid support plate 44 off the base in a manner such that plate 44 "floats" relative to the base; that is plate 44 can move slightly right and left relative to the base, in addition to up and down. Thus shock or torsional forces applied to the base are either minimized or not transmitted at all to the support plate, but are absorbed in the shock mounts. Rigid support plate 44 is a rectangular plate sufficiently thick to resist twisting and flexing. In the preferred embodiment, this plate is an aluminum plate.

In the preferred embodiment, the enclosure 13 includes a source of visible radiation which is used to flood the detection panel 22 with visible radiation following read-out of the detected radiation in preparation for another exposure. The light source used in the embodiment illustrated in FIGS. 5 and 6 is comprised of two electroluminescent panels, a first electroluminescent (EL) panel 50 and a second EL panel 52, positioned above and below the detection panel 22. In the alternative, ultraviolet or infrared radiation may also be used.

EL panel 50 is placed on the underside of detection panel 22 in a space created using a spacer 46 attached along three edges of the support panel. The spacer thickness is approximately equal to the electroluminescent panel thickness. The panel 22 is next attached to the spacer 46 over the support plate 44 forming a slot into which slides the electroluminescent panel 50. This structure provides a mounting arrangement which permits replacement of the electroluminescent panel 50 without need to demount the detector panel, thus minimizing the chance of damaging the detector panel.

On the underside of support plate 44 there are mounted a plurality of printed circuit boards 48 containing electronic components which are part of the detector panel and needed for its operation, but not integral therewith. Flexible connections 33 and 34, of which only one set is illustrated to prevent undue cluttering of the figures, connect the electronic components 31 and 32 on the panel, to the electronic components on the printed circuit boards 48.

In the preferred embodiment where the panel comprises a plurality of charge integrating amplifiers for receiving charges from the plurality of panel pixels, such amplifiers may be placed along the panel edges. The output signal of these integrating amplifiers is typically sent on to further amplification and analog to digital conversion electronics on the printed circuit boards 48 under the support and the detection panel.

The printed circuit boards 48, may also contain the electronics needed for transmission of the image data to the control electronics located outside the enclosure during readout of the information from the digital array as well as the electronics needed for switching the EL panels on and off on command.

Also placed under the support panel 44 or along the sides thereof, and preferably along the edge 42 of base plate 36 are a high voltage power supply 54 for supplying a charging voltage to the detector panel from a low voltage input to the enclosure, and DC to DC converters 58 for supplying appropriate voltages to the various electronic components in the array. Covers 56 and 60 isolate the power supplies from the rest of the components. In the preferred embodiment a single connector 62 brings power to the digital array and also serves as the data link between the controlling electronics 14 and the components in the digital array. Of course separate connectors may be used if desired.

A second light source, EL panel 52, which is also co-extensive with the detector panel 22, is placed over the detection panel 22.

A top cover 38 completes the digital array and together with base 36 forms a light tight enclosure. The top cover comprises a top panel 37 having an inner and an outer surface and has along its edges side walls 39 extending in the direction of the inner surface generally perpendicular to the top panel 37.

Figure 7:
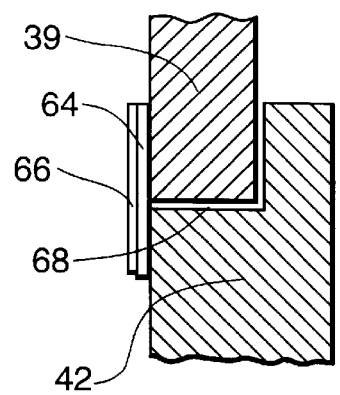
FIG. 7 is a schematic detail of the assembly and connection between the opaque base and the cover forming the enclosure according to this invention

The side walls 39, as best shown in FIG. 7, are sized to fit in a cutout 68 on the raised lip 42 extending from the edges of base 36. The side walls are secured to the lip, preferably with a layer of conforming plastic film 66 over an adhesive layer 64. This arrangement provides a demountable but secure and light tight connection between the top cover and the base. Of course other connecting methods may be used, such as permanently adhering the top cover to the base using an adhesive, or any other means which will provide a secure and light tight joint.

The top cover should be made of material which is substantially transparent to X-ray radiation but opaque to visible radiation. In the preferred embodiment the top cover is constructed of carbon fiber reinforced resin, coated on the inside with an aluminum layer to provide light tightness, x-ray permeability and electrical conductivity. A preferred source of such material and top cover construction is Anholt technologies of Delaware. Thus the combined cover and base both being conductive can be grounded to provide electrical signal isolation for the electronic components within and to minimize electromagnetic radiation leakage from the high frequency signals within.

Exposure to X-ray radiation is known to eventually damage electronic components, especially components containing LSI and thin film transistors. It is thus desirable to provide some radiation shielding to such components whenever such shielding does not interfere with the image capture itself. This may be achieved by incorporating either within the cover, or on the underside of the cover, along the cover edges, outside the image area, thin strips of lead 53 which protect the electronics 31 and 32 arrayed along the detection panel edges. It is also possible to provide thin (1 to 3 mm) sheets of lead shielding over the printed circuit boards on the underside of the support plate. The degree of shielding and thus the thickness of the lead sheeting under the support plate will be determined primarily by such factors as overall acceptable digital array thickness, weight and sensitivity of the components to radiation damage.

Figure 8:
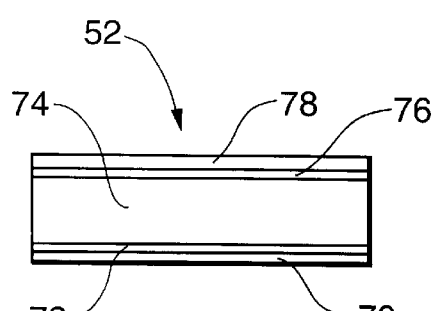
FIG. 8 is a schematic cross section of an electroluminescent panel used in one embodiment of the present invention.

The electroluminescent (EL) panels may be any thin electroluminescent panel available. FIG. 8 illustrates a preferred EL panel 52, which comprises a polyethylene terephthalate (PET) base 70 having a first conductive, transparent indium tin oxide electrode 72 deposited thereon. Over the conductive electrode is a electroluminescent thick film phosphor paste layer 74 and over the phosphor layer a thick film paste dielectric layer 76. Over the dielectric layer is a thick film paste layer carbon electrode and over this layer another PET film 78. The Murfin division of Menasha Corporation in Columbus, Ohio manufactures EL panels suitable for use in this application although any thin EL panel can be used.

EL panels are not the only source of radiation useable in the present invention. For example, infrared radiating (IR) panels may be used instead of visible radiation panels, where the X-ray detector panel photoconductor responds to IR radiation. In the alternative a elongated light source may be placed along the enclosure edges and a lucite type light conductor may be used to flood with visible light the panel, if such panel illuminations is necessary for the operation of the panel. Such flooding of the panel with visible light is needed with certain detection panels to erase prior exposure data before using the panel again.

In the above description, the particular detailed structure, function and electronics needed to operate a detection panel is not discussed in detail since such elements will vary depending on the design and needs of the specific detection panel used in the digital array. Any description provided is for illustration purposes and to explain where the various elements associated with a selected detection panel should be placed and mounted to form a digital array which may be used in a real life environment. Those skilled in the art having the benefit of the teachings of the present invention as hereinabove set forth, can effect numerous modifications thereto. These modifications are to be construed as being encompassed within the scope of the present invention as set forth in the appended claims.

We claim:

1. A digital array for capturing a radiogram comprising:
   a generally flat opaque base having an inner surface and side edges;
   a plurality of shock absorbing mounts on said base inner surface;
   a rigid support mounted on said shock absorbing mounts;
   a radiation electronic detection panel mounted on said rigid support plate, having a front surface and a back surface;
   electronic circuitry associated with said radiation detection panel connected thereto; and
   a cover which is transparent to X-ray radiation and opaque to visible radiation, comprising a top and side walls, said side walls corresponding to the base side edges and attached thereto to form an enclosure opaque to visible radiation, said top having an inner surface oriented opposite the front surface of the radiation detection panel, said top inner surface spaced from said detection panel front surface, and said detection panel spaced from said side walls.

2. The digital array according to claim 1 further comprising:
   a first source of visible radiation generally co-extensive with said front surface of said radiation detection panel located between said front radiation detection panel surface and said top inner surface; and
   switching circuitry operable on command to activate and de-activate said visible radiation source thereby to illuminate said detection panel with visible radiation for a desired period of time.

3. The digital array according to claim 2 further comprising a second source of visible radiation generally co-extensive with said front surface of said radiation detection panel located adjacent the back surface of said panel between the support and the detection panel.

4. The digital array according to claim 1 wherein the rigid support is a plate.

5. The digital array according to claim 1 further comprising a power supply within said enclosure and connected to said electronic circuitry.

6. The digital array according to claim 5 wherein said power supply is a DC voltage power supply and is also connected to said radiation detection panel.

7. The digital array according to claim 1 further comprising an electrical power connector on the outside of the enclosure.

8. The digital array according to claim 1 further comprising an electrical data connector on the outside of the enclosure.

9. The digital array according to claim 1 further comprising a combined electrical power and data connector on the outside of the enclosure.

10. The digital array according to claim 1 wherein the enclosure includes radiation blocking strips.

11. The digital array according to claim 10 wherein the radiation blocking strips are in the cover.

12. The digital array according to claim 11 wherein the radiation blocking strips are lead strips.

13. The digital array according to claim 2 wherein the source of visible radiation is an electroluminescent panel.

14. The digital array according to claim 13 wherein the electroluminescent panel comprises a phosphor containing thick film paste layer, a dielectric thick film paste layer and a carbon electrode thick film paste layer.

15. The digital array according to claim 1 wherein the base includes a raised lip along the edges thereof, the top cover has no side walls and the raised lip extends from the base to the top cover, and is connected thereto, and wherein the detection panel is also spaced from the raised lip.

16. The digital array according to claim 1 wherein the base includes an raised lip along the edges thereof, wherein the top cover side walls are attached to the raised lip and wherein the radiation panel is also spaced from the raised lip.

17. The digital array according to claim 1 wherein the top cover and the side walls are electrically conductive and in electrical contact with the base, and wherein the base is also electrically conductive.

* * * * *